United States Patent [19]

Saito

[11] 4,021,854

[45] May 3, 1977

[54] MINIATURE CASSETTE TAPE RECORDER

[76] Inventor: Shoichi Saito, No. 49, 2-Chome,, Minamidai, Nakano, Tokyo, Japan

[22] Filed: July 27, 1976

[21] Appl. No.: 709,192

Related U.S. Application Data

[63] Continuation of Ser. No. 593,865, July 7, 1975, abandoned, which is a continuation of Ser. No. 408,935, Oct. 23, 1973, abandoned.

[30] Foreign Application Priority Data

Oct. 20, 1972 Japan .............................. 47-104955

[52] U.S. Cl. .................................. 360/62; 360/60; 360/96; 360/137
[51] Int. Cl.² .................. G11B 5/008; G11B 15/04; G11B 15/18
[58] Field of Search .................. 360/62, 60, 96, 137

Primary Examiner—Robert S. Tupper

[57] ABSTRACT

A miniature cassette tape recorder which can be handled by a user's single hand and comprises a chassis provided on one surface with a first sliding plate having a recording and reproducing magnetic head and provided thereon and a second sliding plate having an erasing magnetic head provided thereon, said first and second sliding plates being engageable, and provided on another surface with a third sliding plate connected to a recording and reproducing operation member. This recording and reproducing operation member is cooperated with a recording operation member and movable only in a first direction. This recording operation member is movable in the first direction as well as a second direction substantially normal to the first direction. The tape recorder is provided not only with recording, reproduction, rewind and fast feed operating mechanisms but also with a mechanism for preventing an erroneous erasion of existing records on a tape which has been encountered with a cassette used exclusively for reproduction, a review mechanism for repeatedly reproducing certain part of the tape, and a mechanism for rewinding and fast feeding the tape during the reproduction operation.

14 Claims, 15 Drawing Figures

FIG_1a
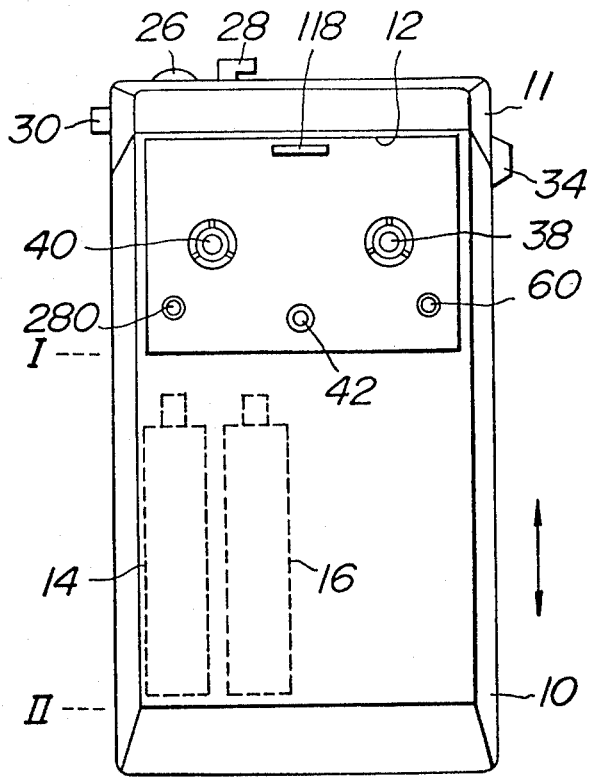
FIG_1b
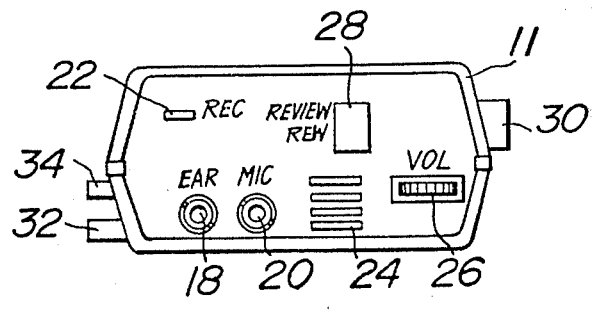

FIG_1c
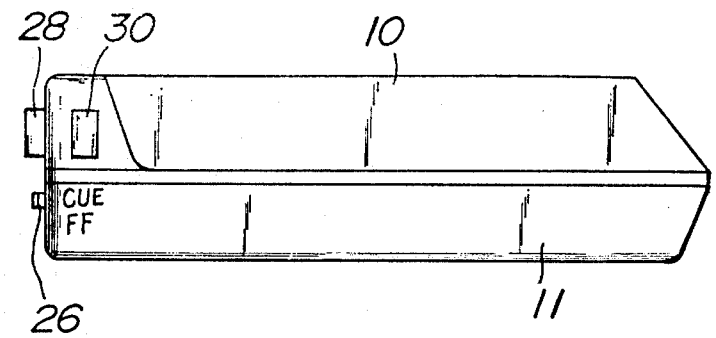
FIG_1d
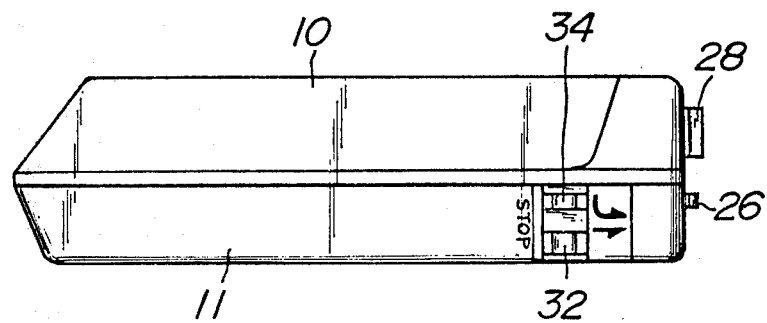

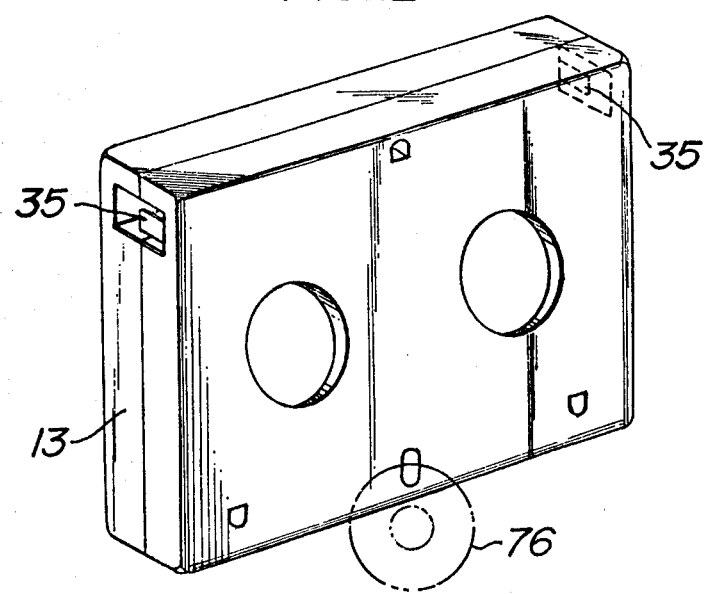

FIG_3
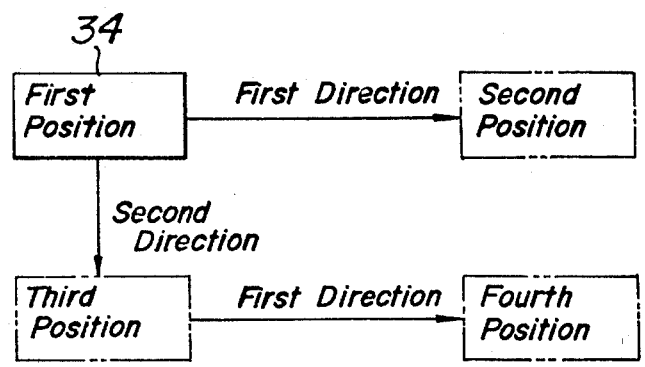

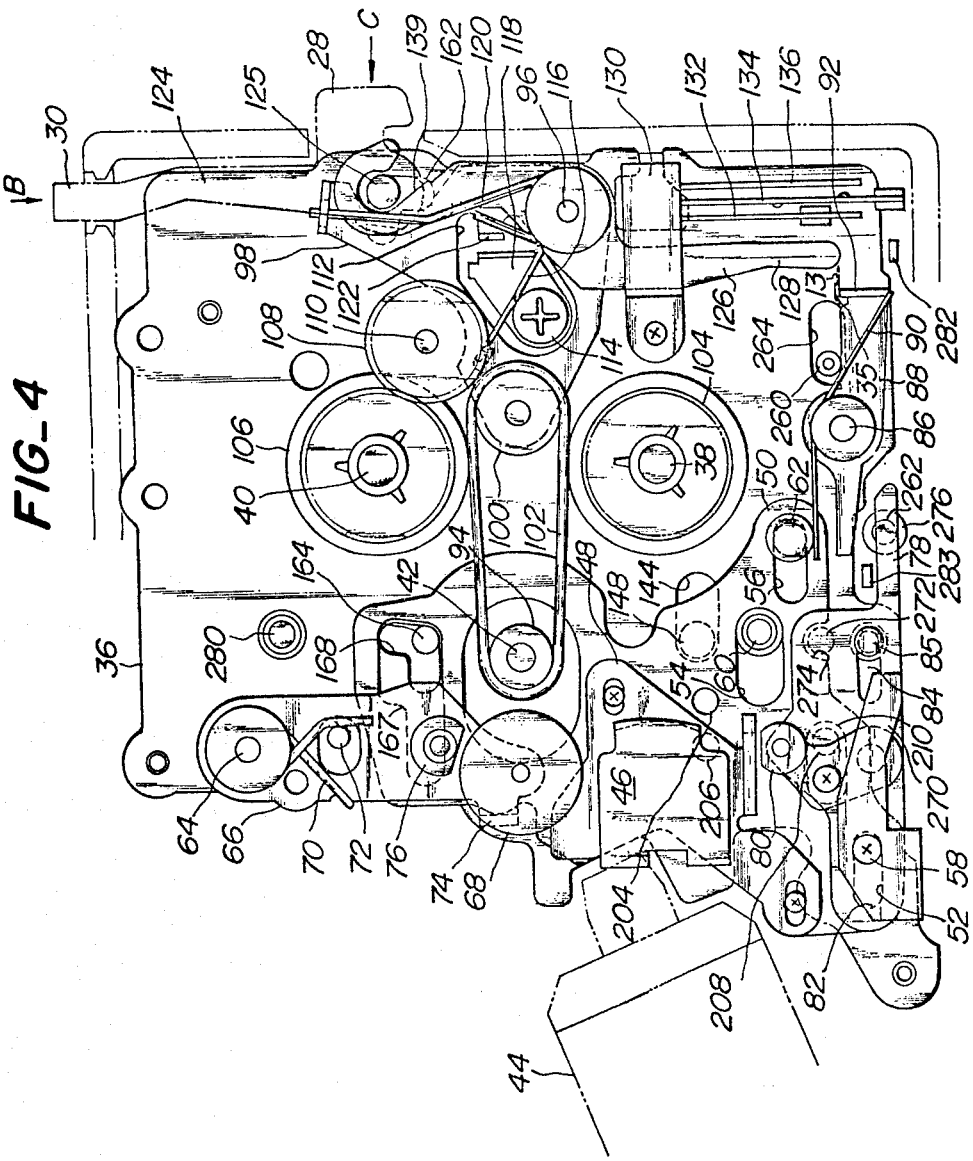

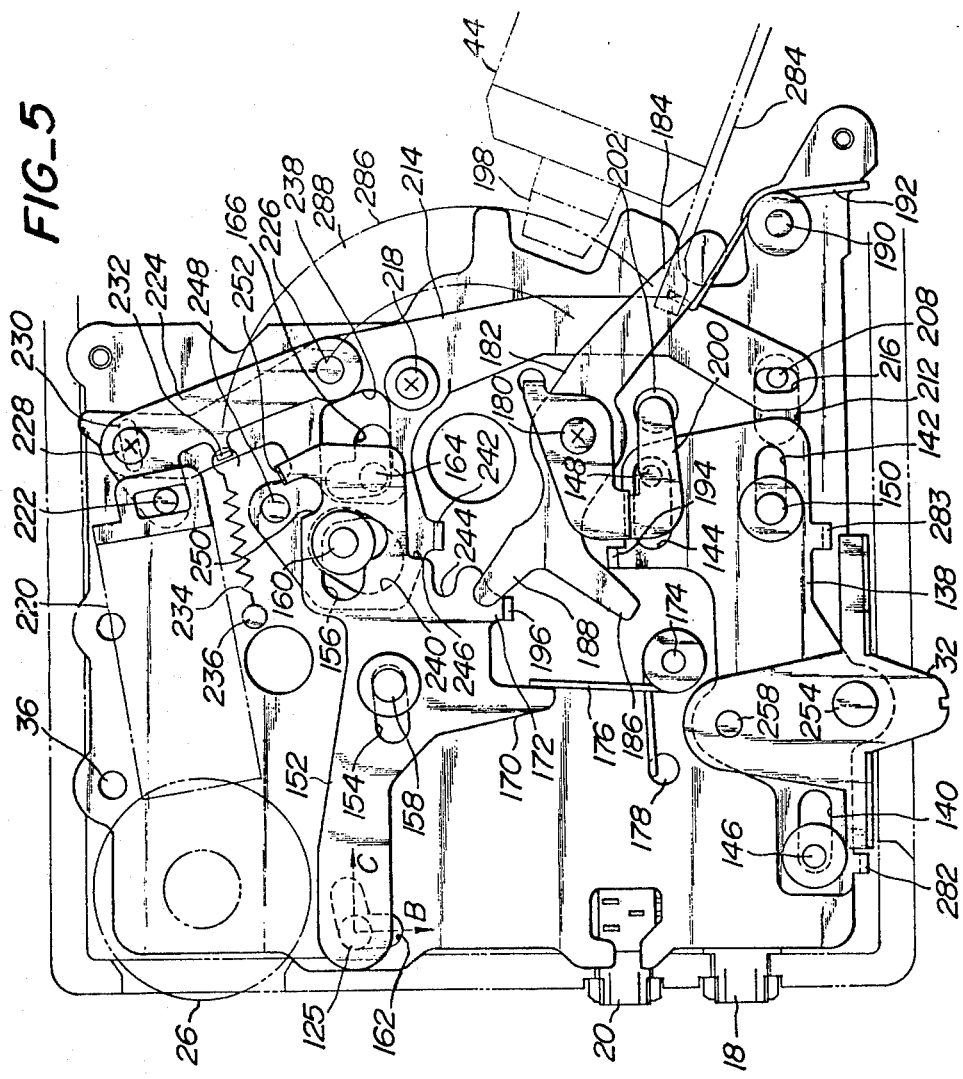

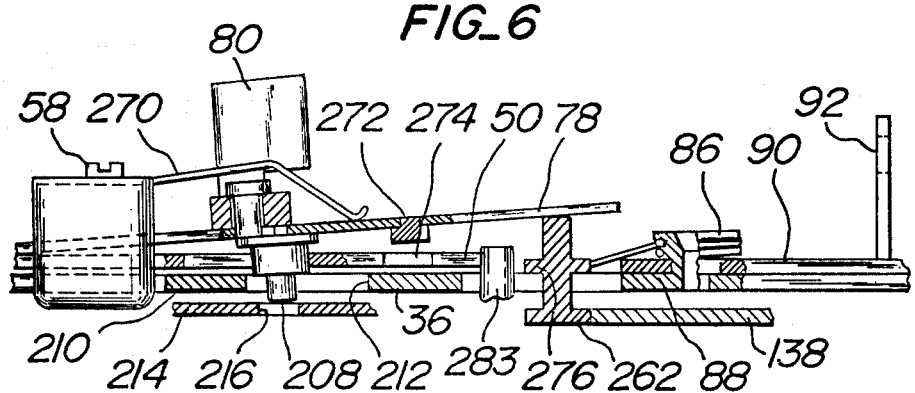
FIG_6
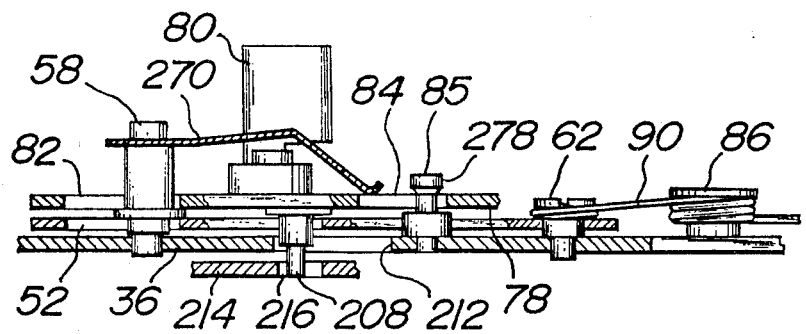
FIG_7
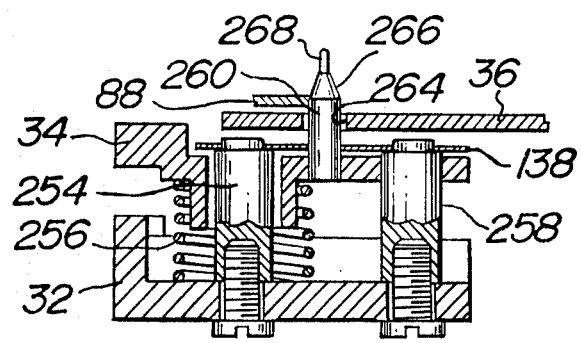
FIG_8

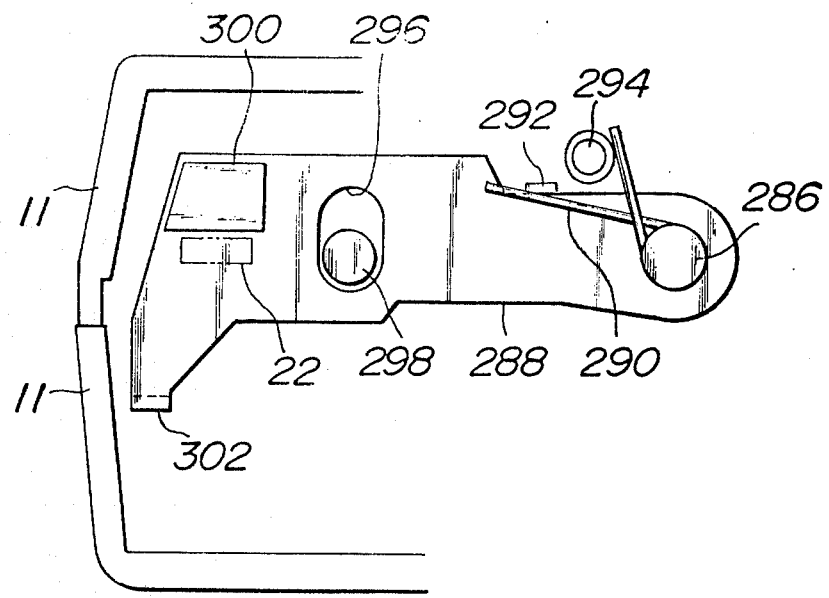
FIG_9
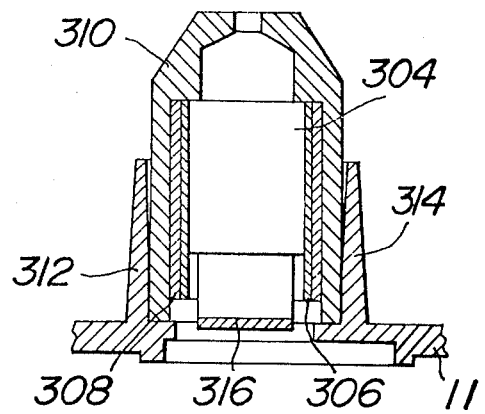
FIG_10

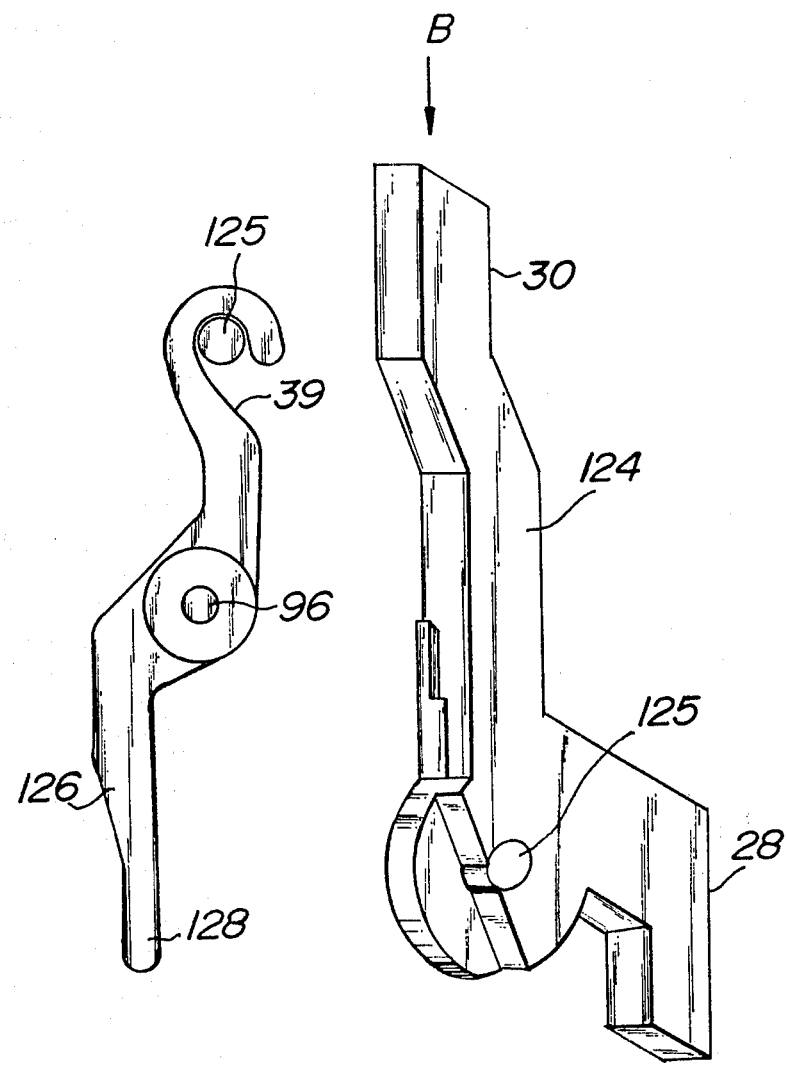
FIG_11

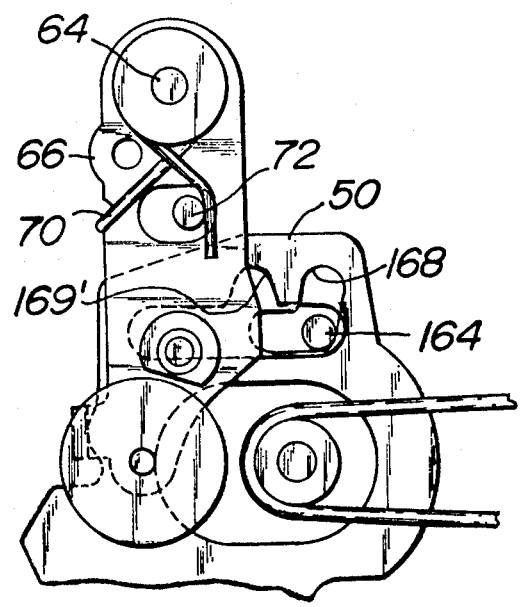
FIG_12

MINIATURE CASSETTE TAPE RECORDER

The present application is continuation of the parent application Ser. No. 593,865, filed July 7, 1975, now abandoned which is a continuation of application Ser. No. 408,935, filed Oct. 23, 1973, now abandoned.

This invention relates to cassette tape recorders and more particularly to a miniature cassette tape recorder which can be handled by a user's single hand.

Recently, various kinds of miniature cassette tape recorders have been proposed, but in practice it is very difficult to obtain such kind of a tape recorder which is small in size, light in weight, easy and reliable in operation and less expensive. In addition, the miniature cassette tape recorder is provided with at least recording, reproduction, rewind and fast feed operating mechanisms, but, in the majority of cases, is not provided with a mechanism for preventing an erroneous erasion of existing records on tape which has been encountered with a cassette used exclusively for reproduction, a review mechanism for repeatedly reproducing certain part of the tape, and a mechanism for rewinding and fast feeding the tape during the reproduction operation. All of these miniature cassette tape recorders comprising such mechanisms are not only complex in construction and expensive but also troublesome in operation and difficult in handling. Particularly, such miniature cassette tape recorder is sometimes inserted into, for example, a user's pocket and handled by his single hand. For this purpose, this miniature cassette tape recorder must be simple in operation without involving any erroneous operation.

An object of the invention is to provide such an improved miniature cassette tape recorder which can obviate the above described disadvantages of the prior art cassette tape recorder, and which can perform various kinds of operations in an extremely easy manner.

Another object of the invention is to provide such an improved miniature cassette tape recorder which can reliably prevent an erroneous erasion of existing records on a tape which has been encountered with a cassette used exclusively for reproduction.

The invention will now be described in greater detail with reference to the accompanying drawings, wherein:

FIG. 1a is a plan view of a cassette tape recorder in accordance with one embodiment of the invention, with a cassette removed for ease of illustration;

FIG. 1b is its top end view;

FIG. 1c is its left side elevational view;

FIG. 1d is its right side elevational view;

FIG. 2 is a perspective view of a cassette having a fin;

FIG. 3 is a diagram illustrating the operation of a recording operation button and a recording and reproduction operating button;

FIG. 4 is a plan view of a tape driving member, and recording, reproduction, rewind, and fast feed operating members as constructed in accordance with the invention;

FIG. 5 is a plan view of the same members seen from the reverse side;

FIG. 6 is a fragmentary cross-sectional view of first and second sliding plates as constructed in accordance with the invention;

FIG. 7 is a cross-sectional view similar to FIG. 6 but showing the first and second sliding plates moved in the second direction;

FIG. 8 is a fragmentary cross-sectional view of a recording operation member and recording and reproduction operating member as constructed in accordance with the invention;

FIG. 9 is an end view of a mechanism for indicating the recording operation;

FIG. 10 is a cross-sectional view of a mechanism for mounting a built in condenser microphone;

FIG. 11 is a perspective view of a fast feed and rewind operating lever and a fast feed operating lever; and FIG. 12 is a plan view of a mechanism for preventing a fast feeding operation from being started at rest condition of the tape recorder according to the invention.

Referring to FIG. 1a, reference numeral 10 designates a lid which covers the top surface of a recorder body 11. The lid 10 is made slidable in its lengthwise direction as shown by arrows. The lid 10 is provided with a transparent window 12 through which may be observed a cassette 13 shown in FIG. 2. If the lid 10 is downwardly drawn until its upper edge arrives at a position shown by dotted lines I in FIG. 1a, the cassette 13 may be inserted into and removed from the tape recorder body 11. In addition, if the lid 10 is further downwardly drawn until its upper edge arrives at a position shown by dotted lines II in FIG. 1a, batteries 14, 16 shown by dotted lines may be exchanged. The lid 10 may be clicked at the positions I and II with the aid of a suitable click mechanism (not shown).

As shown in FIG. 1b, the tape recorder body is provided at its front end surface with an earphone jack 18, microphone jack 20, recording operation indicating window 22, sound absorbing window 24 for a microphone incorporated into the tape recorder body, volume control knob 26, and rewind and review operating button 28.

The tape recorder body 11 is provided at its left side surface with a cue and fast feed operating button 30 only as shown in FIG. 1c and at its right side surface with a recording and reproduction operating button 32 and a recording operation button 34 extending normal to the lengthwise direction of the recorder body 11 and separated one from the other as shown in FIG. 1d. The recording and reproduction operating button 32 may be colored with, for example, black and the recording operation button 34 may be colored with red so as to be easily distinguished one from the other.

The operation of the above mentioned cassette tape recorder will briefly be described.

At first, the lid 10 is drawn until its upper edge arrives at the position I and the cassette 13 is inserted into the tape recorder body 11. Then, the lid 10 is closed again. If it is desired to reproduce the records in the cassette 13, the recording and reproduction operating button 32 and the recording operation button 34 are moved to the right in FIG. 1d to cause a reproduction operation. This direction will hereinafter be called as a first direction shown in FIG. 3. The sound reproduced can be heard by connecting an earphone to the earphone jack 18. In this case, the best reproduced sound may be obtained by controlling the volume control knob 26. In addition, an external speaker may be connected to the earphone jack 18 to hear the reproduced sound through the speaker. During the reproduction, if the rewind and review operating button 28 is pushed, a pinch roller is disengaged from a capstan and at the same time the rotation of a supply reel driving shaft is reversed to be described later, and as a result, a rewind operation can be effected during the reproduction of the records. This rewind operation will hereinafter be called also as a review operation. In addition, if the fast feed operating button 30 is pushed, a fast feed operation is effected during the reproduction of the records.

If the recording and reproduction operating button 32 and the record operating button 34 are returned to their original positions, the reproduction operation becomes stopped.

The recording operation may be effected as follows. There are two kinds of cassettes, that is, a cassette exclusively used for the reproduction in which the recorded contents must not be erased by an erroneous recording operation and another cassette which can be used for both recording and reproduction. If the cassette exclusively used for the reproduction is inserted into the tape recorder body 11 and the recording operation is effected by mistake, there is a risk of the important records being erased by such erroneous recording operation. In order to avoid such disadvantage, the cassette 13 is provided with a fin 35 as shown in FIG. 2. This fin 35 may be cut off when the cassette 13 is exclusively used for reproduction. This fin 35 is remained as it is when the cassette 13 is used for both recording and reproduction.

The cassette tape recorder according to the invention can detect the presence or absence of such fin 35 so as to prevent the above mentioned erroneous erasion of the existing records. That is, if the recording operation button 34 is pushed downwardly toward the recording and reproduction operating button 32, i.e., in a second direction shown in FIG. 3, a fin detecting mechanism becomes operated such that the presence of the fin 35 permits the downwardly pushed recording operation button 34 together with the recording and reproduction operating button 32 to move toward the right in FIG. 1d, i.e., in the third direction shown in FIG. 3, but the absence of the fin prevents the above mentioned movement of the recording operation button 34 and the recording and reproduction operating button 32, and as a result, the records on the cassette 13 exclusively used for reproduction are prevented from being erroneously erased. In addition, the cue and fast feed operating button 30 and the rewind and review operating button 28 could not be pushed during the recording operation.

When the recording and reproduction operating button 32 and the recording operation button 34 are at their respective rest positions, i.e. at their first positions shown in FIG. 3, the rewind and review operating button 28 may be pushed so as to effect the normal rewind operation and the cue and fast feed operating button 30 may be pushed so as to effect the fast feed operation.

As stated hereinbefore, the rewind and the fast feed operations may be effected during the reproduction of the records. As a result, if a suitable signal sound (hereinafter will be described as cue signal) is recorded beforehand on the tape in accordance with the record contents, the tape can rapidly be rewound or can fast be fed until the tape arrives at its predetermined position.

Heretofore, it has been proposed to indicate the running distance of the tape by means of a counter. Such indicating means, however, is expensive and the counter must always be observed during its operation so that is troublesome in operation.

On the contrary, the tape recorder according to the invention is capable of hearing the recorded signal by rewinding and fast feeding the tape during the reproduction thereof and hence observing the predetermined tape position. Therefore, the tape recorder according to the invention is significantly beneficial to the user.

If it is desired to effect recording operation, the recording operation button 34 is pushed downwardly from its first position in the second direction to the third position shown in FIG. 3 to detect the presence or absence of the fin 35 and the pushed recording operation button 34 together with the recording and reproduction operating button 32 are moved to the right in FIG. 1d only, i.e., from the third position in the first direction to the fourth position as shown in FIG. 3 when there is present the fin 35, and as a result, there is no danger of erroneously erasing the existing records on the cassette 13 used exclusively for the reproduction. In addition, this operation can easily be effected by a single hand of the user.

In FIG. 4 is shown tape driving members of the cassette tape recorder constructed as above described in detail. FIG. 4 shows these tape driving members which are removed from the tape recorder body 11 with a cover plate on which is mounted the cassette 13 being also removed. In FIG. 5 is shown the reverse surface of the tape driving members shown in FIG. 4. Provision is made of a chassis 36 on which are rotatably mounted a tape supply reel driving shaft 38 and a tape up reel driving shaft 40. In addition, on the chassis 36 is rotatably mounted a capstan 42 to which is secured a flywheel 286 in the usual manner. To the periphery of the flywheel 286 is secured a rubber ring 288 against which is urged the forward end of a driving shaft 198 of a motor 44.

A recording and reproducing magnetic head 46 is secured to a mounting plate 48 which is secured to a first sliding plate 50. The mounting plate 48 is adjustably mounted on the first sliding plate 50 such that the recording and reproducing head 46 can adjustably be located at its desired position. The first sliding plate 50 is provided with a plurality of grooves 52, 54, 56 into which are inserted guide pins 58, 60, 62 secured to the chassis 36, respectively, and permit the first sliding plate 50 to slide on the chassis 36. This sliding direction is the first direction described above with reference to FIG. 3.

The chassis 36 is further provided with a pin 64 about which is rotatably mounted a lever 66. Near the free end of the lever 66 is rotatably mounted a pinch roller 68. Around the pin 64 is wound a coil spring 70 whose one end engages with the lever 66 and the other end engages with a pin 72 secured to the chassis 36. The lever 66 is provided near at its free end with a lug 74 extending along the side edge of the lever 66 and engaged with corresponding side edge of the first sliding plate 50. The coil spring 70 causes the lever 66 to rotate about the pin 64 in the anti-clockwise direction. This rotation of the lever 66 is limited by bringing the lug 74 into engagement with the first sliding plate 50. To the lever 66 is secured a cassette holding pin 76 which is provided at its upper end with a flange for holding the cassette 13.

The first sliding plate 50 is provided on its upper side with a second sliding plate 78 to which is secured an erasing magnetic head 80. The second sliding plate 78 is provided with grooves 82 and 84 within which engage the pin 58 and a pin 85 secured to the chassis 36, respectively. These pin-groove connections permit the second sliding plate 78 to slide on the chassis 36 in the first direction shown in FIG. 3 in the same manner as the first sliding plate 50.

The chassis 36 is further provided with a pin 86 around which is rotatably mounted a fin detecting lever 88. Around the pin 86 is mounted a coil spring 90 whose one end engages with a fin detecting lug 92 formed at one end of the fin detecting lever 88 and the other end engages with the guide pin 62 so as to bias the fin detecting lever 88 in the anti-clockwise direction.

To the capstan 42 constituting a part of the tape driving mechanism is secured a pulley 94 and a freely rotatable pulley 100 is rotatably mounted by a rewind operating lever 98 rotatably pivoted to a pivot pin 96 secured to the chassis 36. An endless rubber belt 102 is engaged across the pulleys 94 and 100. Secured to the tape supply reel driving shaft 38 and the tape take up reel driving shaft 40 are gears 104 and 106, respectively, and an intermediate gear 108 threadedly engaged with the gear 106 is rotatably mounted on a shaft 110 secured to the chassis 36. The rewind operating lever 98 is provided with a hole 112 which encircles a fixed pin 114 secured to the chassis 36. Around the pin 114 is mounted a coil spring 116 whose one end engages with a cassette engaging member 118 and the other end engages with the lever 98, whereby the lever 98 is biased around the pivot pin 96 in the clockwise direction to always urge the rubber belt 102 against the intermediate gear 108.

If the capstan 42 is driven in the clockwise direction by means of a motor 44, the rotation of the capstan 42 is transmitted through the pulley 94, belt 102, pulley 100, intermediate gear 108 and gear 106 to the tape take up reel driving shaft 40, thereby rotating the shaft 40 in the clockwise direction. If the rewind operating lever 98 is rotated about the pin 96 in the counterclockwise direction against the bias of the spring 116, the rubber belt 102 is disengaged from the intermediate gear 108 and urged against the gear 104, and as a result, it is possible to rotate the tape supply reel driving shaft 38 in the counterclockwise direction.

Around the pivot pin 96 is wound a coil spring 120 which is stronger than the coil spring 116 and one end of the spring 120 engages with a lug 122 formed on the lever 98, while the other end of the spring 120 engages with a shaft 125 secured to a rewind operating plate 152 and engaged with a hook-shaped groove 162 formed in a rewind, fast feed operating lever 124 which is comprised of the rewind operating button 28 and fast feed operating button 30. In case of rewinding the tape, if the rewind operating button 28 is pushed in a direction shown by an arrow C, the lever 98 is rotated about the pin 96 against the bias of the spring 116. In this case, the spring 120 plays a role of accumulating an amount of spring force required for urging the rubber belt 102 against the gear 104.

To the pivot pin 96 is pivoted a fast feeding lever 126 whose one end 128 extends substantially in parallel with contact blades of a switch 130 such that if the lever 126 is rotated in the counterclockwise direction, a contact blade 132 is urged against contact blades 134, 136 to close all of these contact blades.

The fast feeding lever 126 is provided at its another end with a groove-shaped notch 137 inclined from the lengthwise direction of the lever 126 and engaged with the pin 125. The rewind fast feed operating lever 124 extends in parallel with one side of the tape recorder casing and has one end 30 projected out of the tape recorder casing and operable as the fast feed operating button. In addition, the lever 124 is also extended normal to its lengthwise direction and has one end 28 projected out of the tape recorder casing and operable as the review and rewind operating button 28.

As seen from FIG. 5, the chassis 36 is provided at its reverse side with a third sliding plate 138 which is connected to the recording and reproducing operation button 32 and slidably mounted on the chassis 36 with the aid of grooves 140, 142-pins 146, 150 connection. In addition, the chassis 36 is provided at its reverse side with a rewind operating plate 152 which extends from the shaft 125 to a position near the capstan 42 and slidably mounted on the chassis 36 with the aid of grooves 154, 156 formed on the plate 152 and pins 158, 160 projected from the reverse side of the chassis 36. As seen from FIG. 5, the chassis 36 is provided with a hook-shaped groove 162 through which is extended the shaft 125. As a result, if the rewind operating button 28 or the fast feed operating button 30 is pushed, the shaft 125 is moved in the direction shown by the arrow C or in the direction shown by the arrow B. The shaft 125 is extended through the chassis 36 and secured to the rewind operating plate 152. To the other end of the rewind operating plate 152 is secured an operation pin 164 which is projected through a hook-shaped groove 168 formed in the chassis 36 into a ⌒﹆-shaped groove 167 (FIG. 4) formed in the first sliding plate 50. The rewind operating plate 152 is provided at its side edge with two projecting arms 170, 172 extending downwardly therefrom and separated one from the other.

To the reverse side of the chassis 36 is secured a pin 174 around which is wound a coil spring 176 whose one end engages with a small hole 178 formed in the chassis 36 and the other end engages with the projecting arm 170. The spring 176 causes the rewind operating plate 152 to rotate about the fixed pin 158 in the clockwise direction.

To the reverse side of the chassis 36 is secured a fixed pin 180 to which is pivoted a lever 182 provided at its one end with an engaging and disengaging arm 184 and at its other end with forked arms 186, 188. To the reverse side of the chassis 36 is secured a fixed pin 190 around which is wound a coil spring 192 whose one end engages with the chassis 36 and the other end is urged against the engaging and disengaging arm 184 such that the lever 182 is caused to be rotated about the pin 180 in the counterclockwise direction so as to bring always the forked arms 186, 188 into engagement with lugs 194, 196 of the third sliding plate 138 and rewind operating plate 152, respectively, on the one hand and to always bring the engaging and disengaging arm 184 into engagement with a tapered end of a driving shaft 198 of the motor 44 on the other hand. In the rest position shown in FIG. 5, the engaging and disengaging arm 184 engages with the tapered end of the driving shaft 198 of the motor 44 and causes the driving shaft 198 of the motor 44 to be separated from the flywheel 286 against the spring force urging the driving shaft 198 against the flywheel 286.

To the fixed pin 180 is secured substantially ⊐ -shaped leaf spring 200 which brings a portion of a ball 202 through the chassis 36 into engagement with click holes 204, 206 formed in the first sliding plate 50.

The third sliding plate 138 is provided with a pin 148 which is secured to the first sliding plate 50 and extended through a groove 144 formed in the chassis 36.

As a result, if the third sliding plate 138 secured to the recording and reproducing operation button 32 is moved in the first direction shown in FIG. 3, the pin 148 causes the first sliding plate 50 to move also in the first direction.

FIG. 6 is a side elevation showing parts near the first and second sliding plates 50, 78. As shown in FIG. 6, to the second sliding plate 78 is secured a pin 208 which is projected through a groove 210 formed in the first sliding plate 50 and a groove 212 formed in the chassis 36 into the reverse surface of the chassis 36. As shown in FIG. 5, the above mentioned pin 208 is inserted into an elongate hole 216 formed at one end of a recording and reproduction change-over lever 214 which is rotatably pivoted to a pin 218 secured to the chassis 36. To the lever 214 is secured a plate 224 to which is secured a pin 222 which can drive a recording and reproduction change-over switch 220. The lever 214 is provided with a pin 226 to which is rotatably pivoted the plate 224 whose other end is secured to the lever 214 by means of a screw 228 which engaged with an elongate hole 230 formed in the lever 214. A position of the screw 228 with respect to the elongate hole 230 is so adjusted that when the lever 214 is rotated about the pin 218 in the clockwise direction, the pin 222 causes the changeover arm of the recording and reproduction change-over switch 220 to change from the reproduction side to the recording side. The plate 224 is provided at its side edge with a lug 232 to which is connected one end of a tension spring 234 whose other end engages with a fixed pin 236 secured to the chassis 36. As a result, the lever 214 is normally biased by the spring 234 so as to be rotated in the counterclockwise direction. The lever 214 is also provided with a hole 238 through which is extended the pin 164 and with a hole 240 through which is extended the pin 160.

The lever 214 is also provided with a lug 242 which in the rest condition is opposite to a notch 244 formed in the rewind operating plate 152, but in case of recording becomes in opposite to a stepped portion 246 formed on the rewind operating plate 152.

The lever 214 is also provided with a pin 248 which in the rest condition is opposite to a notch 250 formed in the rewind operating plate 152, but in case of recording becomes in opposition to a lug 252 formed in the rewind operating plate 152.

As shown in FIG. 7, the recording operation button 34 is movably engaged around a shaft 254 secured to the recording and reproduction operating button 32. The shaft 254 is encircled by a coil spring 256 which normally serves to separate the recording operation button 34 from the recording and reproduction operating button 32. To the other end of the shaft 254 is secured the third sliding plate 138. In addition, the third sliding plate 138 and the recording and reproduction operating button 32 are connected together by means of a second shaft 258 around which is movably fitted the recording operation button 34. To the recording operation button 34 are secured a pair of pins 260, 262. The pin 260 is projected upwardly through a groove 264 formed in the chassis 36.

The pin 260 is provided with a tapered upper portion 266 whose upper end is formed into a needle-shaped portion 268.

As shown in FIG. 6, the other pin 262 secured to the recording operation button 34 is projected upwardly through the chassis 36 and made contact with the reverse surface of the second sliding plate 78. To the chassis 36 is secured a leaf spring 270 which serves to resiliently urge the second sliding plate 78 against the chassis 36. The spring force of the coil spring 256 is made stronger than that of the leaf spring 270 so as to upwardly bias the second sliding plate 78 by means of the pin 262 as shown in FIG. 6, and as a result, a pin 272 secured to the second sliding plate 78 is separated from a notch 274 formed in the first sliding plate 50. The pin 262 secured to the recording operation button 34 is provided at its intermediate portion with a flange 276 whose operation will be described later.

As shown in FIG. 7, the pin 85 provided for the chassis 36 is provided at its upper end with an enlarged diameter portion 278 which engages with the right end of the groove 84 formed in the second sliding plate 78 and enlarged correspondingly. As a result, the second sliding plate 78 raised to the position shown in FIG. 6 could not be moved in the first direction shown in FIG. 3. But, when the second sliding plate 78 is pressed down to the position shown in FIG. 7 and the enlarged diameter portion 278 is disengaged from the groove 84, the second sliding plate 78 together with the first sliding plate 50 may be moved in the first direction shown in FIG. 3.

The operation of the cassette tape recorder according to the invention will now be described. The cassette 13 shown in FIG. 2 is inserted into the recorder body by means of a pair of guide pins 280, 60 and a cassette clamping member 118 shown in FIG. 1a. At first, the reproduction operation will be described. The recording operation button 34 and the recording and reproduction operating button 32 are moved from their respective first position in the first direction to their respective second position shown in FIG. 3. In the case, the recording operation button 34 is not pushed downwardly, i.e., from its first position in the second position to its second position, so that the pin 260 secured to the button 34 is not displaced. The fin detecting lever 88 engages with the pin 260 as shown in FIG. 8. As a result, the fin detecting lever 88 is prevented from being rotated. As shown in FIG. 4, in this condition, the lug 283 projected upwardly from the side edge of the third sliding plate 138 through the chassis 36, is deviated from the left end of the fin detecting lever 88 so that the third sliding plate 138 can move in the first direction. The third sliding plate 138 is connected through the pin 148 to the first sliding plate 50 so that the first sliding plate 50 is also moved in the first direction. In this case, since the second sliding plate 78 is at its raised position and the pin 272 is disengaged from the notch 274, the second sliding plate 78 remains at its raised position. If the first sliding plate 50 is moved the first direction, the recording and reproducing head 46 is moved through an opening formed in the side surface of the cassette 13 into the cassette 13 and comes into contact with the tape. The lever 66 for supporting the pinch roller 68 follows the first sliding plate 50 by the action of the coil spring 70 and hence the pinch roller 68 is also moved in the first direction and resiliently urged through the tape against the capstan 42. This biassing force is given by the coil spring 70 and hence is always constant whereby the tape is precisely driven. If the lever 66 is moved in the first direction, the flange formed on the upper end of the cassette holding pin 76 becomes in engagement the upper side edge of the cassette 13 as shown in FIG. 2, thereby holding the cassette 13. As a result, even through the user erroneously try to remove the cassette 13 from the tape recorder body 11 during the recording and reproducing operations, the cassette holding pin 76 prevents such removal of cassette. Thus, it is possible to prevent the pinch roller 68, magnetic head 46 and, eventually, the cassette 13 proper from being damaged.

In FIG. 5, if the recording and reproduction operating button 32 and the third sliding plate 138 secured thereto are moved to the left, i.e., to the first direction, the lug 194 is pushed upon one of the forked arms 186 to rotate the lever 182 in the clockwise direction against the action of the spring 192, whereby the engaging and disengaging arm 184 is disengaged from an arm 284 for restraining the motor 44 against a spring force. As a result, the spring force causes the driving shaft 198 of the motor 44 to move to a position where the driving shaft 198 is urged against the rubber ring 288 of the flywheel 286. The third sliding plate 138 is provided at its side edge with a lug 282 projected upwardly from one portion of the side edge. In case of reproduction, the lug 282 is urged against the center contact blade 134 to bring it into contact with the contact blade 136. If the center contact blade 134 is in contact with the contact blade 136, an electric circuit is energized to supply an adjusted current to the motor 44, thereby rotating it at a given adjusted speed.

In case of reproduction, the second sliding plate 78 is not moved and hence the pin 208 is not moved. As a result, the lever 214 is located at the position shown in FIG. 5 and the recording and reproduction changeover switch 220 is positioned at the reproduction side.

The reproduction operation is effected as described above. In the reproduction position, the recording operation button 34 is prevented from being pushed downwardly. For this purpose, the flange 276 of the pin 262 secured to the first sliding plate 50 is slidably engaged with the upper side of the chassis 36. As a result, even when the recording operation button 34 is pushed, the flange 276 of the pin 262 becomes in contact with the chassis 36 to prevent a push down movement of the recording operation button 34.

The rewinding operation during the reproduction, that is, the reviewing operation will now be described. In this case, review and rewind operating button 28 is pushed in a direction shown by an arrow C. As a result, the shaft 125 is moved in the direction shown by the arrow C in FIG. 5 and the rewind operating plate 152 secured to the shaft 125 is also moved in the direction shown by the arrow C. In this case, the lever 214 is located at the position shown in FIG. 5 and its lug 242 is opposite to the notch 244 formed in the rewind operating plate 152. If the shaft 125 is moved in the direction shown by the arrow C, the spring 120 is also moved in this direction to rotate the lever 98 about the pin 96 whereby the rubber belt 102 is disengaged from the intermediate gear 108 and urged against the gear 104, thereby rotating the tape supply reel driving shaft 38 in the counterclockwise direction. As shown in FIG. 5, if the rewind operating plate 152 is moved in the direction shown by the arrow C, the pin 164 secured to the plate 152 is also moved in the same direction. As a result, the lever 66 for supporting the pinch roller 68 is rotated in clockwise direction in FIG. 4 to separate the pinch roller 68 from the capstan 42. Thus, the tape can be rewound during the rotation of the capstan 42 in the tape supplying direction. The above described review operation for rewinding the tape during its reproduction is capable of rewinding the tape to a desired position which hearing the signal sound. In addition, the user can substantially observe the desired tape position and can repeatedly reproduce the required tape portion.

In this case, if the shaft 125 is moved in the direction shown by the arrow C, the lever 126 is rotated about the pin 96 in counterclockwise direction. As a result, one end 128 of the lever 126 causes all of the contact blades 132, 134, 136 to be closed. If the contact blades 132 and 134 are closed, a large current is supplied to the motor 44 to rotate it at a high speed. As a result, in case of the review operation the tape runs at a speed which is higher than that at the ordinary recording and reproduction operations.

The cue operation which is effected during the reproduction by pushing the fast feed button 30 will now be described. In this case, The shaft 125 is moved in a direction shown by an arrow B and urged against the side edge of the inclined notch 139 formed in the lever 126. As a result, the lever 126 is rotated in the counterclockwise rotation to make all the contact blades 132, 134, 136 of the switch 130 in contact each other. Thus, a large current is supplied to the motor 44 to rotate it at a high speed. Contrary to the above described review operation, in the cue operation the pinch roller 68 is urged against the capstan 42 and the rubber belt 102 is also urged against the intermediate roller 108. As a result, the tape is supplied in the forward direction at a speed which is higher than that of the reproduction operation. Thus, the fast feed operation is effected during the reproduction so as to rapidly supply the tape to its desired position.

Now, the normal rewind and fast feed operation will be described. In this case, the recording and reproduction operating button 32 and the recording operation button 34 are made at rest and the rewind operating button 28 or the fast feed operating button 30 is pushed. If the rewind operating button 28 is pushed, the shaft 125 is moved in the direction shown by the arrow C to rotate the lever 126 in the counterclockwise direction, thereby making all the contact blades 132, 134, 136 contact each other. As a result, a large current is supplied to the motor 44 to rotate it at a high speed. At the same time, the rewind operating plate 152 is also moved in the direction shown by the arrow C so that the lug 196 of the projecting arm 172 is urged against the forked arm 188 of the lever 182 to rotate the lever 182 about the pin 180 in the clockwise direction. Similar to the above described reproduction operation, the engaging and disengaging arm 184 is disengaged from the restraining arm 284 to rotate the motor 44 by the spring force, thereby urging the driving shaft 198 against the rubber ring 288 of the flywheel 286 and rotating the capstan 42.

Next, if the fast feed operating button 30 is pushed in the direction shown by the arrow B, the shaft 125 causes the lever 126 to rotate about the pin 96 in the counterclockwise direction to make all the contact blades 132, 134, 136 contact each other, thereby rotating the motor 44 at a high speed. In this case, the lever 98 is not rotated so that the rubber belt 102 is urged against the intermediate gear 108. Thus, the tape take up reel driving shaft 40 is rotated in a tape take up direction at a high speed to effect the fast feed operation.

Next, the recording operation will now be described. In this case, the recording operation button 34 is pushed downwardly, i.e., in the second direction shown in FIG. 3 against the action of the spring 256. As a result, the fin detecting lever 88 is disengaged from the enlarged diameter portion of the pin 260 and comes into engagement with the tapered portion 266 and then with needle-shaped portion 268. In this case, the cassette 13 having the fin 35 as shown in FIG. 2 is capable of effecting the recording and reproduction operations. That is, even when the pin 260 is pushed downwardly and disengaged from the fin detecting lever 88, the fin detecting end 92 engages with the fin 35 as shown in FIG. 4 so that the fin detecting lever 88 could not be rotated. As a result, that end of the fin detecting lever 88 which is opposite to the fin detecting end 92 is located out of the path of the lug 283 which is secured to the third sliding plate 138.

If the recording operation button 34 is pushed downwardly in the second direction, the pin 262 is also pushed downwardly. As a result, the second sliding plate 78 is urged against the first sliding plate 50 by the action of the spring 270. The pin 272 secured to the second sliding plate 78 is inserted into the notch 274 formed in the first sliding plate 50. At the same time, the groove 84 formed in the second sliding plate 78 is disengaged from the enlarged diameter portion 278 of the pin 85.

As described above, the recording operation button 34 after pushed downwardly together with the recording and reproduction operating button 32 can be moved in the first direction. In this case, not only the third sliding plate 138 and first sliding plate 50, but also the secone sliding plate 78 are moved in the first direction by means of the pin 272-notch 274 engagement. In this case, if the recording operation button 34 is pushed downwardly in the second direction, the pin 262 is pushed downwardly such that the upper surface of the flange 276 of the pin 262 comes to a position which is lower than the lower surface of the chassis 36. As a result, after the rcording operation button 34 and recording reproduction operating button 32 have been moved in the first direction, the flange 276 of the pin 262 engages with the chassis 36 whereby the recording operation button 34 is prevented from being upwardly pushed by means of the spring 256.

If the recording operation button 34 and recording and reproduction operating button 32 are moved in the first direction as described above with respect to the reproduction operation, the lug 282 of the third sliding plate 138 causes the contact blade 134 of the switch 130 to be pushed and made in contact with the contact blade 136 to supply an adjusted current to the motor 44 thereby rotating it at a given adjusted speed. If the third sliding plate 138 is moved in the first direction, the lug 194 is urged against the forked arm 186 to rotate the lever 182 and hence disengage its arm 184 from the restraining arm 284, whereby the driving shaft 198 of the motor 44 is urged against the rubber ring 288 of the flywheel 286 to rotate the capstan 42. In this case, the lever 98 is not rotated so that the rubber belt 102 is urged against the intermediate gear 108. Thus, the tape take up reel driving shaft 40 is rotated in a given direction at a given adjusted speed.

In addition, in case of the recording operation, the pin 208 secured to the second sliding plate 78 is also moved in the first direction so that the lever 214 is rotated in the clockwise direction against the action of the spring 234 to withdraw the turn-over arm of the recording and reproduction turn-over switch 220, thereby turning over from the reproduction operation to the recording operation. As seen from the above, the presence of the fin 35 on the cassette 13 permits a given recording operation to be effected.

Now, the use of the cassette not provided with the fin 35 and exlusively used for the reproduction will be described. In this case, if the recording and reproduction operating button 34 is pushed downwardly, the pin 260 is also pushed downwardly. As a result, the fin detecting lever 88 is rotated by the action of the spring 90 and engages with the tapered upper portion 266 and then with the needle-shaped end portion 268 of the pin 260. The absence of the fin permits the fin detecting lever 88 to be rotated for a larger angle and hence the end of the lever 88 is moved into the path of the lug 283 formed in the third sliding plate 138. As a result, even when the user erroneously tries to move the recording operation button 34 and recording and reproduction operating button 32 in the first direction, the end of the fin detecting lever 88 comes in contact with the lug 283 which prevents the movement of these buttons 34, 32 in their first directions. As seen from the above, the cassette 13 not provided with the fin 35 and used exclusively for the reproduction can reliably prevents an erroneous eraslon of the existing records on the tape.

A safety mechanism for preventing the rewinding operation button 28 and fast feed operating button 30 from being pushed during the recording operation will now be described. In case of the recording operation, the lever 214 is rotated about the pin 218 in the clockwise direction, its lug 242 arrives at a position which is opposite to the stepped portion 246 of the rewind operating plate 152 and a pin 248 secured to the lever 214 arrives at a position which is opposite to the lug 252 of the rewind operating plate 152. As a result, the rewind operating plate 152 could not be moved in the direction shown by the arrow C and also could not be rotated. Thus, the shaft 125 secured to the rewind operating plate 152 could not be moved in the direction shown by the arrow C and also could not be moved in the direction shown by the arrow B, and as a result, the rewind operating button 28 and fast feed operating button 30 could not be pressed.

As stated hereinbefore, the tape recorder according to the invention is provided at its front end with the window 22 through which can indicate a red mark. Now, this recording operation indicating mechanism will be described. As shown in FIG. 9, to the reverse side of the front end of the recorder casing 11 is secured a pin 286 about which is rotatably mounted a lever 288. Around the pin 286 is wound a coil spring 290 whose one end engages with a lug 292 formed in the lever 288 and the other end engages with a pin 294 secured to the front end of the recorder casing so as to bias the lever 288 in the clockwise direction. The lever 288 is provided with a groove 296 into which is inserted a pin 298 secured to the recorder casing 11. The pin 298-groove 296 connection is capable of limiting the rotation of the lever 288. The lever 288 is provided near at its free end with a red colored portion 300 which is opposite to the window 22. The lever 288 is further provided at its free end with a lug 302 extending to the lower side of the recording operation button 34. In case of the recordint operation, if the recording operation button 34 is pushed downwardly, the recording operation button 34 is urged against the lug 302 of the lever 288 to push it downwardly. As a result, the lever 288 is rotated in the counterclockwise direction to bring the red colored portion 300 into coincidence with the window 22. Thus, the user can see the red colored portion 300 through the window 22 and becomes aware that the recording operation is proceeding. It is preferable that the red colored portion 300 is coated with a noctilucent paint which enables the red mark 300 to be clearly indicated at dark.

In FIG. 10 is shown a mechanism for mounting a built-in microphone. In the present embodiment, use is made of a condenser microphone 304 whose casing is covered with a relatively thin rubber cylinder 306. The rubber cylinder 306 is resiliently covered with a brass cylinder 308. The assembly is resiliently enclosed in a relatively thick rubber cap 310. A pair of projections 312 and 314 are formed integral with the reverse side of the recorder casing 11. These projection are formed into arcuate in form and between these arcuate projections 312, 314 are resiliently inserted the rubber cap 310. As seen from the above, the microphone body 304 can be mounted on the recorder body 11 in a simple manner. As described above, the microphone body 304 is covered with both the rubber caps 306, 310 and the brass cylinder 308 so that the microphone body 304 is efficiently prevented from being subjected to vibrations. Therefore, the recording can be effected in extremely good sound quality.

As shown in FIG. 4, the first sliding plate 50 is provided at its upper portion with a  -shaped groove 169. This groove 169 may be replaced by a  -shaped groove 160' as shown in FIG. 11. In this case, the operating pin 164 secured to the rewinding operation plate 152 engages with the right end of the groove 169' at the rest condition of the record player as shown in FIG. 11. As a result, the operating pin 164 could not be moved even when the user tries to push the fast feeding operation button 30 in the direction shown by that arrow B in FIG. 4 so as to effect the fast feeding operation. Thus, the motor 44 is not required to produce an excessive torque, thereby reducing the power necessary for the power source.

What is claimed is:
1. A cassette tape recorder for magnetically recording an audio signal in a magnetic tape in a cassette and magnetically reproducing audio signal recorded on the tape, particularly a miniature cassette tape recorded suitable for being operated by a single hand of a user and comprising:
   1. a cassette receiving portion for holding the cassette in a predetermined position;
   2. tape driving means for driving the tape in tape feeding and rewinding directions at a plurality of preselected speeds including a motor, a flywheel driven by the motor, a capstan coupled with the flywheel, a pinch roller cooperating with the capstan and tape feeding means and rewinding means having a tape supply reel driving shift, a tape take-up reel driving shaft and feeding tape by means of said tape take-up reel driving shaft and rewinding tape by means of said tape supply reel driving shaft;
   3. A recording and reproducing magnetic head and an erasing head;
   4. a housing for said recorder having a side wall;
   5. A recording button and a recording and reproducing buttom, both buttons projecting outwardly from said side wall of said housing;
   6. A chassis means for slidably mounting said buttons coaxially and adjacent each other, said chassis means mounting said recording and reproducing button for movement only in a first direction between a first and a second position and said recording button for movement in said first direction between a first and a second position as well as in a second direction perpendicular to said first direction between said first position and a third position and in said first direction between said third and fourth direction;
   7. recording and reproducing circuit means having a recording and reproduction changeover switch to switch selectively operation between recording and reproducing operation; and
   8. means connecting said two buttons and said circuit means including a third sliding plate secured to said recording and reproducing button, a recording and reproducing change-over lever and a rewind operating lever, whereby said circuit means is switched into a reproducing condition when both said recording and reproducing button and recording button are moved in said first direction from their first positions to their second positions and into a recording condition when only said recording button is moved in said second direction from its first position to its third position and then both said recording and reproducing button and said recording button are moved in said first direction with said recording and reproducing button being moved from its first position to its second position and said recording button being moved from its third position to its fourth position.

2. A cassette tape recorder as claimed in claim 1, and comprising further a first sliding plate coupled to a recording and reproducing button and having a recording and reproducing magnetic head mounted thereon and movable in said first direction, a second sliding plate having an erasing magnetic head mounted thereon and movable in said first direction together with said first sliding plate, mounting means for said first and second sliding plates, including a plurality of grooves, formed in said first sliding plate and engaged with corresponding guide pins secured to said chassis and grooves formed in said second sliding plate and engaged with corresponding guide pins secured to said chassis and means connecting said first and second plates and said recording and reproducing button and said recording button including said third sliding plate secured to said recording and and reproducing button, said first sliding plate having a notch and said second sliding plate having a pin normally disengaged from said notch and becoming engaged with said notch only when said recording button is moved in said second direction, whereby when the recording is effected and said recording button is moved in said second direction, both said first sliding plate and said second sliding plate are moved in said first direction to cause both said recording and reproducing magnetic head and said erasing head to make contact with the magnetic tape, only said first sliding plate being moved in said first direction to cause only said recording and reproducing magnetic head to make contact with the magnetic tape when the reproduction is effected and said recording button is not moved in said direction.

3. A cassette tape recorder as claimed in claim 1, and comprising further a spring, a recording operation indicating lever rotatably mounted on a pin secured to the front end of a recorder casing and subjected to the action of said spring wound around said pin and normally biasing said recording operation indicating lever in a clockwise direction, said lever having near its free end a red colored portion opposed to a window formed in the end wall of the recorder casing and a lug engaged with said recording operation button, whereby when said recording operation button is pushed in said second direction, said red colored portion becomes opposed to said window against the bias of said spring.

4. A cassette tape recorder as claimed in claim 1, wherein said recording and reproduction change-over lever is pivotably supported at its center by said chassis and is provided at its free ends with lugs, said lugs being disengaged from a rewind operating plate in the case of reproduction, and being engaged with said rewind operating plate in the case of recording, thereby preventing erroneous operation of said rewinding operating button and fast feed operating button.

5. A cassette tape recorder as claimed in claim 4, wherein said recording and reproduction change-over lever is secured to a plate having a pin, a recording and reproduction change-over switch driven by said pin and having two contacts, one of which is closed when recording so as to supply current to said recording head and the other contact being closed when reproducing so as to receive a pick-up current from said reproducing head, said recording and reproduction change-over lever having at its other end an elongated hole engaging a pin secured to said second sliding plate and having at its intermediate portion a lug engageable a stepped portion of said rewind operating plate, whereby in the case of recording, both said rewind operating button and said fast feed operating button, cannot be erroneously pressed.

6. A cassette tape recorder as claimed in claim 1, and comprising further a rewind and fast feed operating lever having at its center a movable shaft movably engaged with a L-shaped groove formed in said chassis and comprising a rewind operating button and a fast feed operating button constituted by free ends of said lever, said rewinding operating button being connected through a rewind operating lever rotatably engaged at one of its free ends with said movable shaft and rotatably supporting at another free end a freely rotatable pulley to a tape supply reel, said fast feed operating button being connected through a fast feeding lever rotatably engaged at its upper end with said shaft and having one end operating a motor through a speed changing switch.

7. A cassette tape recorder as claimed in claim 6, and comprising further a rewind operating plate secured to said shaft and slidably engaged with said first sliding plate, a pinch roller supporting lever pivotably mounted at its upper end on said chassis and having a free end engaged with said first sliding plate, a pinch roller rotatably mounted on the free end of said pinch roller supporting lever, a tape supply reel rotatably supporting lever, a tape supply reel rotatably mounted on said chassis, and a rewind operating lever pivotably mounted substantially at its center on said chassis and rotatably engaged at one of its free ends with said shaft and rotatably supporting at another free end a freely rotatably pulley, whereby when said rewind and review operating button is pushed, said shaft is moved to rotate said pinch roller supporting lever through said rewind operating lever and first sliding plate to separate said pinch roller from said capstan, on the one hand, and directly rotate said rewind operating lever to make said freely rotatable pulley contact with said tape supply reel, on the other hand.

8. A cassette tape recorder as claimed in claim 6, wherein said rewind and fast feed operating lever comprises said rewind operating button and said fast feed operating button slidably supported by said movable shaft and guided along said L-shaped groove, whereby said movable shaft effects both the fast feed and rewinding operations from the stop condition of the tape recorder and effects both the cue and review operations from the reproduction condition of the tape recorder.

9. A cassette tape recorder as claimed in claim 6, wherein said speed changing switch includes three contact blades, two of said contact blades being opposed to and closed by a lug provided for said third sliding plate, all of said contact blades being opposed to and closed by a lower end of said fast feeding lever, whereby when said recording and reproducing button and recording button are pushed in said first direction, said third sliding plate is moved in said first direction to make two of said contact blades contact with each other, thereby rotating said motor at a given speed, upon pushing said rewinding operating button and fast feed operating button, said fast feeding lever is rotated to make all said contact blades contact with each other, thereby rotating said motor at a high speed.

10. A cassette tape recorder as claimed in claim 6, wherein said L-shaped groove is comprised of a vertical branch groove extending in parallel with the side edge of said chassis and a horizontal branch groove extending perpendicular to said branch groove and when said rewind operating button is pushed, said movable shaft becomes engaged with said horizontal branch groove of said L-shaped groove and when said fast feed operating button is pushed, said movable shaft becomes engaged with said vertical branch groove of said L-shaped groove, thereby selectively effecting the rewind operation and the fast feed operation.

11. A cassette tape recorder as claimed in claim 1, and comprising further a fin detecting lever having a fin detecting portion and always biased by a coil spring toward a position in which a cassette can be freely inserted into said cassette reviewing portion and means connecting said fin detecting lever and said recording and reproducing button and said recording button including a conical pin secured to said recording button and a third sliding plate secured to said recording and reproducing button, said cassette cooperating with said recording button in a manner such that when said recording button is moved in said second direction, said fin detector lever being driven into a position in which the presence or absence of a fin fitted to said cassette is detected, the movement of both said recording and reproducing button and said recording button in said first direction driving the tape recorder in the reproducing condition, if a cassette having said fin is inserted into said cassette receiving position, the movement of both said recording and reproducing button and said recording button in said first direction being inhibited if a cassette having no fin is inserted into said cassette receiving portion.

12. A cassette tape recorder as claimed in claim 11, wherein said fin detecting lever is pivotably supported at its center by said chassis and always biased toward said position in which said cassette can be freely inserted into said cassette receiving portions by means of a conical pin secured to said recording operating button and projected upwardly through a groove formed in said chassis and having a tapered upper portion with upper end formed into a needle-shaped portion, said fin detecting lever being engaged with a large diameter portion of said conical pin when said cassette is not inserted into the recorder body and being engaged with said needle-shaped portion of said conical pin when said cassette is inserted into the recorder body, whereby in the case of reproduction when both said recording and reproducing button and said recording button are pushed in said first direction, both said third sliding plate and said first sliding plate are movable into the reproduction condition, but in the case of recording when said recording operating button is pushed in said second direction said conical pin is also moved in said second direction permitting said fin detecting lever to move into said position in which the presence and absence of said fin is detected.

13. A cassette tape recorder as claimed in claim 11, and comprising further a lug on said third sliding plate, means mounting said third sliding plate on said chassis including grooves formed in said third sliding plate and engaged with guide pins and a pin projected upwardly from said third sliding plate and engaged with a groove formed in said chassis, said lug when said cassette having no fin is inserted in said cassette receiving portion, become opposed to one end of said fin detecting lever so as to inhibit the movement of said third sliding plate.

14. A cassette tape recorder as claimed in claim 13, wherein said third sliding plate secured to said recording and reproducing button is slidably mounted on said chassis by grooves formed in said third sliding plate and pins secured to said chassis and upwardly projecting into said grooves and having at its side edge two lugs separated from each other, one of these lugs being opposed to said contact blade and the other lug being opposed to one end of said fin detecting lever when said cassette having no fin is inserted into said cassette receiving portion and said fin detecting lever is rotated by the action of said coil spring.

* * * * *